(12) United States Patent
Stepan et al.

(10) Patent No.: US 7,597,030 B2
(45) Date of Patent: Oct. 6, 2009

(54) ROTATING STRIPPING HEAD FOR CABLE STRIPPING APPARATUS

(75) Inventors: Jiri Stepan, Sargans (CH); Thomas Stepan, Sargans (CH)

(73) Assignee: Schleuniger Holding AG, Thun (CH)

( * ) Notice: Subject to any disclaimer, the term of this patent is extended or adjusted under 35 U.S.C. 154(b) by 0 days.

(21) Appl. No.: 11/909,671

(22) PCT Filed: Mar. 27, 2006

(86) PCT No.: PCT/IB2006/000683

§ 371 (c)(1),
(2), (4) Date: Sep. 25, 2007

(87) PCT Pub. No.: WO2006/100590

PCT Pub. Date: Sep. 28, 2006

(65) Prior Publication Data

US 2008/0257112 A1  Oct. 23, 2008

Related U.S. Application Data

(60) Provisional application No. 60/594,293, filed on Mar. 25, 2005.

(30) Foreign Application Priority Data

Mar. 25, 2005 (CH) .................... 00588/05

(51) Int. Cl.
*H02G 1/12* (2006.01)
(52) U.S. Cl. ........................................ 81/9.51; 81/9.42
(58) Field of Classification Search ................. 81/9.51, 81/9.42
See application file for complete search history.

(56) References Cited

U.S. PATENT DOCUMENTS

| 4,745,828 | A | * | 5/1988 | Stepan | ........................ 81/9.51 |
| 4,869,135 | A | * | 9/1989 | Hoffa | ........................ 81/9.51 |
| 4,920,830 | A | * | 5/1990 | Stepan | ........................ 81/9.51 |
| 4,942,789 | A | * | 7/1990 | Hoffa et al. | .................. 81/9.51 |
| 4,981,054 | A | * | 1/1991 | Stepan | ........................ 81/9.51 |
| 5,010,797 | A | | 4/1991 | Stepan | |
| 5,111,720 | A | * | 5/1992 | Stepan | ........................ 81/9.51 |
| 5,199,328 | A | * | 4/1993 | Hoffa | ........................ 81/9.51 |
| 5,243,882 | A | | 9/1993 | Stepan | |
| 5,361,384 | A | | 11/1994 | Stepan | |
| 5,579,666 | A | * | 12/1996 | Sakashita et al. | ............. 81/9.42 |
| 5,582,078 | A | | 12/1996 | Talley | |
| 5,596,802 | A | * | 1/1997 | Koch et al. | .................... 29/825 |
| 5,896,786 | A | * | 4/1999 | Akita | ........................ 81/9.41 |
| 6,176,155 | B1 | | 1/2001 | Palmowski et al. | |

(Continued)

FOREIGN PATENT DOCUMENTS

DE   201 17 931 U 1   1/2003

(Continued)

*Primary Examiner*—David B Thomas
(74) *Attorney, Agent, or Firm*—Davis & Bujold, P.L.L.C.

(57) ABSTRACT

The invention relates to a novel insulation stripping head which can also be used in particular as a spare part for existing rotational insulation stripping apparatuses. It is particularly stable and simple to produce while at the same time providing the same or improved precision. It substantially has insulation stripping blades (3) and centering jaws (4) which can be swiveled in laterally and, during operation for insulation stripping, rotate together about the main axis (1).

32 Claims, 6 Drawing Sheets

U.S. PATENT DOCUMENTS

| | | |
|---|---|---|
| 6,286,393 B1 | 9/2001 | Messer et al. |
| 6,321,621 B1 | 11/2001 | Stepan |
| 6,561,061 B1 * | 5/2003 | Stepan ..................... 81/9.51 |
| 7,140,273 B2 * | 11/2006 | Palmowski et al. .......... 81/9.51 |
| 2002/0029663 A1 | 3/2002 | Hombu |

FOREIGN PATENT DOCUMENTS

WO    2005/046015 A1    5/2005

* cited by examiner

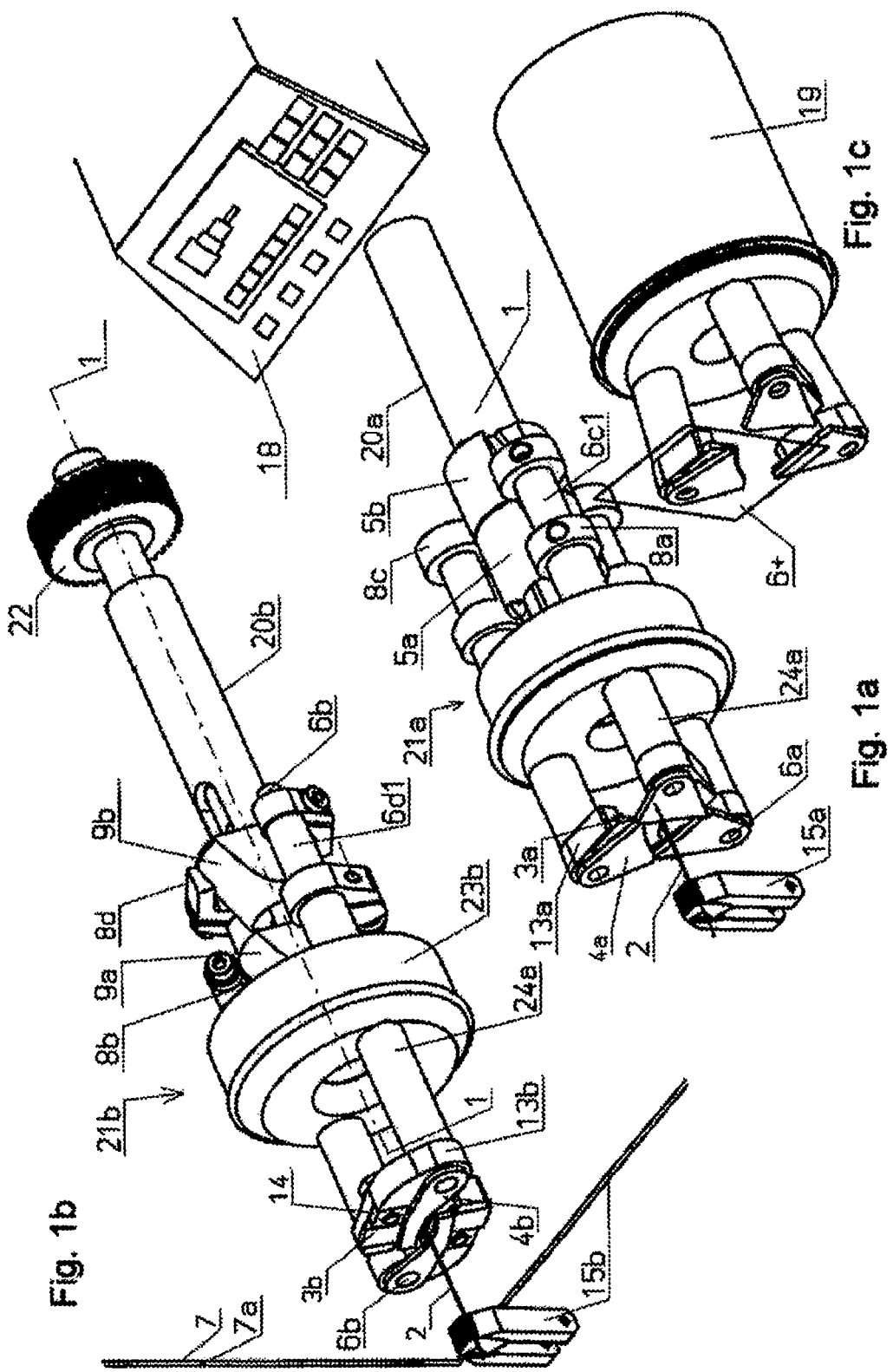

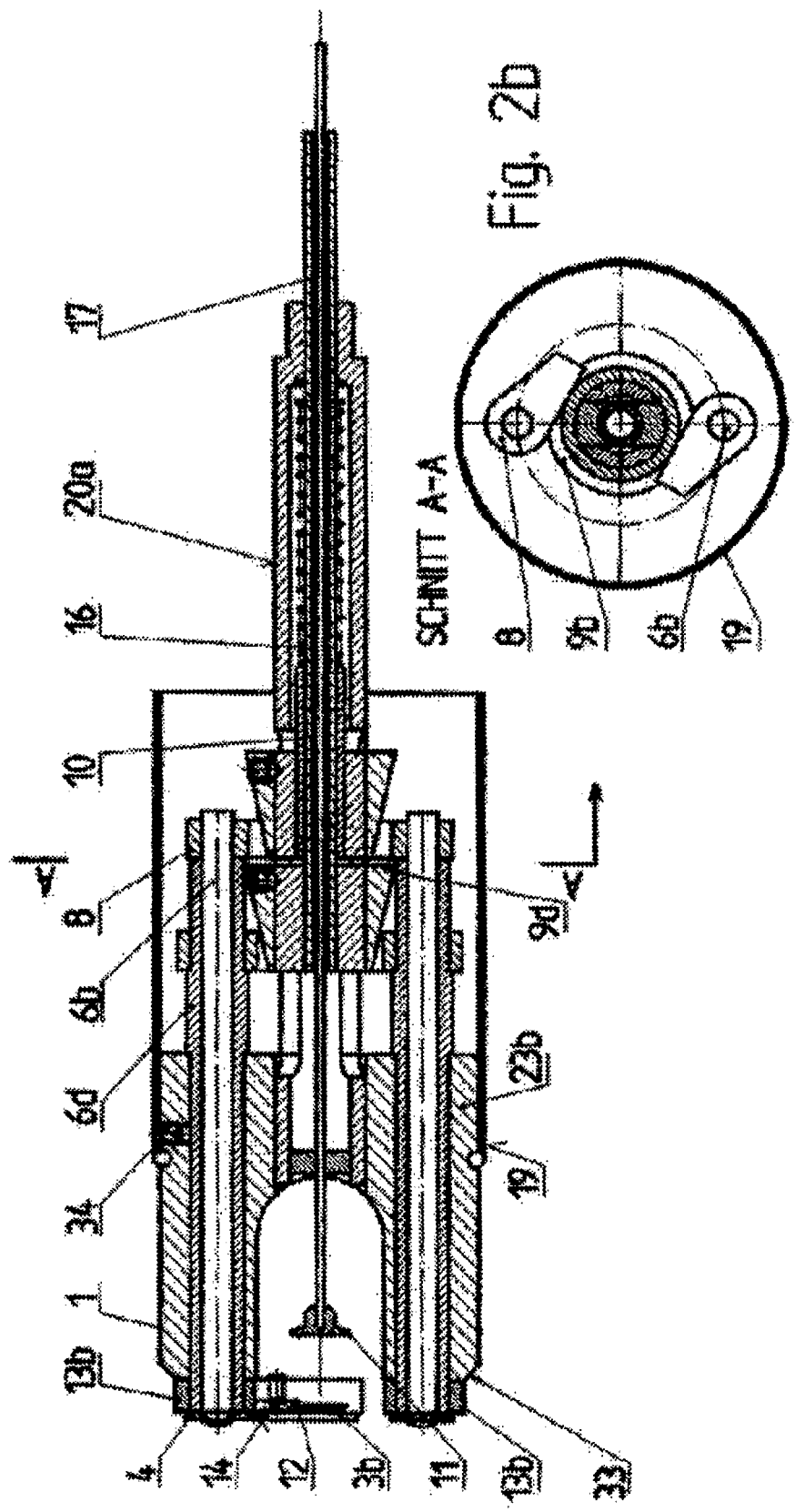

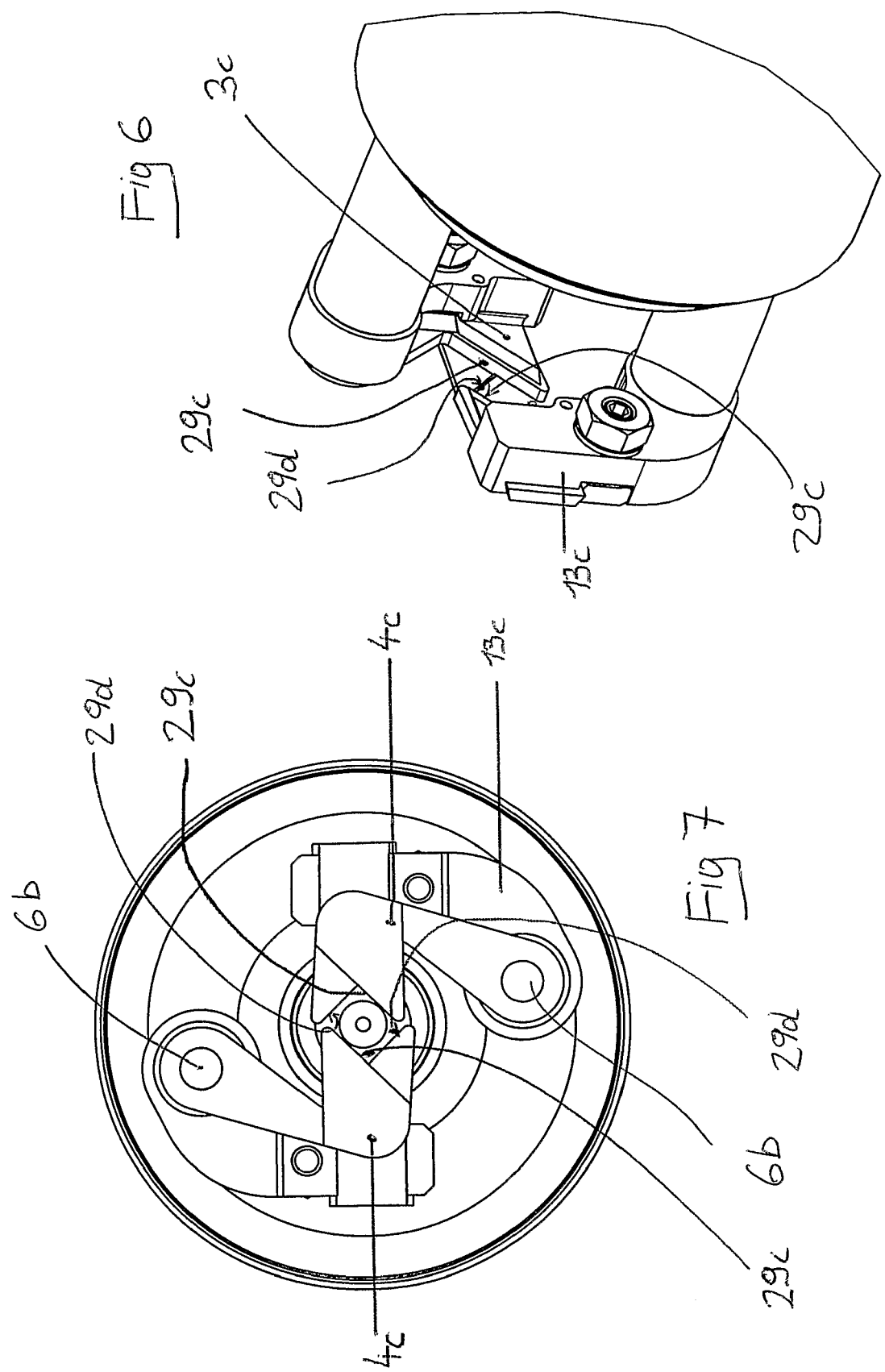

ROTATING STRIPPING HEAD FOR CABLE STRIPPING APPARATUS

This application is a national stage completion of PCT/IB2006/000683 filed Mar. 27, 2006 which claims priority from Swiss Application Serial No. 00588/05 filed Mar. 25, 2005 and also claims priority from U.S. Provisional Application Ser. No. 60/594,293 filed Mar. 25, 2005.

DESCRIPTION

The invention relates to a rotating insulation stripping head for an insulation stripping apparatus for conductors which can be arranged along a main axis, in particular conductors having multilayer insulation (coaxial cables), optical fibers, insulated wires or the like. In particular, however, the invention relates without restriction to insulation stripping apparatuses which do not operate by the continuous method, i.e. in which a continuous cable which enters on one side of the machine and exits again on the other side of the machine is not fed in but instead a cable which can be introduced into the machine on one side and removed again from the machine in the opposite direction.

Many such insulation stripping apparatuses are known in the prior art. The most well known and popular apparatuses worldwide for coaxial cables originate from the Applicant and were or are designated by the following type designations: HC 207, MP 257, MP 8015, MC 252, CS 5300, CS 5300MX, CS 5400. For stripping the insulation from optical fibers, the Applicant also successfully launched on the market the apparatus with the type designation FO 7045. There are various industrial rights application and patents which protect these apparatuses, including the patent family relating to the following patents: U.S. Pat. Nos. 5,361,384; 5,243,882; 5,010,797; 6,321,621. A recent development in the coaxial insulation stripping sector, which has since already been published will be published later as a PCT Patent Application. The PCT Application number: PCT/IB2004/003020.

All stated apparatuses, some having a structurally similar design and some also having a structurally different design, comprise at least one insulation stripping blade (as a rule there are at least two or more insulation stripping blades, but, according to the present invention, it would also be possible to provide only one insulation stripping blade if a centering jaw is opposite to it) and at least one centering or retaining jaw (as a rule, there are at least two or more centering or retaining jaws but, according to the present invention, it would also be possible to provide only one centering or retaining jaw if this is opposite to an insulation stripping blade) in the immediate vicinity of the insulation stripping blade (immediate vicinity is understood to mean that the centering or retaining jaw, when viewed in the axial direction of a conductor from which insulation is to be stripped, are arranged as far as possible side by side, i.e. a small distance apart). Both insulation stripping blade and centering or retaining jaw are movable—independently of one another—toward the main axis and away therefrom in the closing and opening direction at least over a certain distance, so that the insulation stripping blade or blades and the centering or retaining jaw or jaws are movable in the direction of the main axis.

In all embodiments, the insulation stripping blade or blades can be rotated under motor power about the main axis. The main axis is thus simultaneously an axis of rotation for the insulation stripping blade or blades and for the centering jaws. (Not for the Fiber Optic 7045 design, where only the blades rotate.)

The cutting depth of the insulation stripping blade or blades is electromechanically (this is the case in another variant of the prior art, namely in an embodiment according to U.S. Pat. No. 6,176,155, which, together with its patent family, also belongs to the Applicant) or electronically (in the case of all above-mentioned apparatuses of the Applicant) adjustable.

All stated apparatuses from the prior art, with the exception of MC252 and CS5300MX, have one thing in common: the activation of the rotatable blades and of the centering jaws is effected by means of levers which are pivotable about a pivot axis. These pivot axes are perpendicular to the main axis. As a rule, cones which actuate the proximal end of the lever are provided, while the distal ends of the lever directly or indirectly engage the blade. In the most well known above embodiments (beginning with HC 207 and MP 257) this is also true for the centering jaws, i.e. these too are actuated by means of two-armed levers. For the desired precision of the apparatuses, this requires fairly complicated manufacturing both in the mounting of the levers and in the actuation thereof and at the distal ends in the transmission of the adjustment movement to the blades and centering jaws.

In the known machines MC252 and CS5300MX, the rotatable blades are actuated by means of a cage which itself rotates with the rotating blades about the main axis. The cage is rotated relative to the blades, with the result that the blades are fed in. The rotation of the cage is effected via grooved tracks. In these grooved tracks, a linear movement is converted into a rotational movement by means of a peg moved in the direction of the main axis. This setup requires fairly complicated manufacture, particularly with the desired precision of the apparatuses.

SUMMARY OF THE INVENTION

It is the object of the invention to improve said apparatuses so that the actuation of the blades takes place more simply and in a manner such that the actuation of the centering or retaining jaws also takes place by a method which is just as simple and is readily compatible with the blade actuation without having to rely on complicated and expensive components.

In other words, without adversely affecting the precision of the apparatus, it is intended to simplify the components used in the region of the blade and centering jaw or retaining jaw actuation.

This object is achieved if each insulation stripping blade and each centering or retaining jaw coordinated with the insulation stripping blade are each drivable electromechanically or under motor power in the closing and opening directions by means of a drive shaft extending parallel or at an acute angle to the axis, and if at least the drive shaft or shafts of the installation stripping blade or blades is or are motor driven so as to be rotatable together with the insulation stripping blade or blades about the main axis.

By means of the invention, the object is achieved in a surprisingly simple manner. Instead of a lever arrangement which leads to the above-mentioned disadvantages, the novel shaft arrangement for insulation stripping blade and centering or retaining jaw provides a substantially simpler apparatus which can be more easily produced. Thus, for example, a rotating part can be made by mass production more easily and at less cost than a cutter part. A shaft is of course primarily a rotating part. By the measures according to the invention, the insulation stripping apparatuses according to the invention become more rigid and therefore more precise than in the past but with lower production cost. Since the drive shafts are rotatable together with the blade or blades, the desired insulation stripping blade rotation as, for example, in the MC207 or FO 7045 is also retained, said rotation being known to be required for high precision insulation stripping, particularly in the case of coaxial cables or optical fiber cables.

In a second step, in the case of a preferred insulation stripping apparatus, both the drive shafts of the insulation stripping blade and the drive shafts of the centering or retaining jaw can be rotatable about the main axis. Thus, for example, a conventional HC 207 or MP 257 may be produced with entirely the same function but with the novel insulation stripping head with its production advantages. These known, well established machines can thus be produced considerably more cheaply. It is to be expected that the entire head can be made more rigid, which has a positive influence on the processing quality of the cables or wires from which insulation is to be stripped.

With appropriate dimensions, the insulation stripping heads according to the invention can even be offered as spare parts or exchange heads for machines already on the market. The patent claims are to be interpreted in such a way that such exchange heads are also within their scope of protection.

As in the case of the HC 207 and MP 257 or MP 8015 mentioned, preferably at least two insulation stripping blades and at least two centering or retaining jaws are provided, preferably a centering or retaining jaw being coordinated opposite each insulation stripping blade in order to achieve a good centering function, and/or one insulation stripping blade or one centering and retaining jaw (4) each being coordinated opposite each insulation stripping blade or each centering or retaining jaw.

Thus, according to the invention, insulation stripping blades can cooperate directly with opposite insulation stripping blades and/or directly with opposite centering jaws. However, the invention is not limited to this and it is also possible to use other known teachings and experiences, such as, for example, those according to which the number of centering jaws and insulation stripping blade jaws should be different.

If the same number of centering jaws as insulation stripping blades are provided it may be advantageous if the number of centering jaws or insulation stripping blades is uneven. Thus, for example, as in the setup according to U.S. Pat. No. 5,010,797, it would be possible to provide three rotatable insulation stripping blades, to the side of which, according to the invention, three rotatable centering jaws are simultaneously positioned. In the case of the arrangement of three insulation stripping blades, the opening enclosed by the insulation stripping blades approximates a triangle from which a cable cannot slip out laterally, in contrast, for example, to an arrangement having only two insulation stripping blades.

A particular, novel insulation stripping blade actuation envisages that the insulation stripping blades and/or the centering or retaining jaws are guided in linear guides and are movable directly or indirectly—for example via a gear—by the drive shafts coordinated with each of them. In contrast to apparatuses in which the insulation stripping blades are thus firmly connected to the shafts and are swiveled laterally toward the conductor, in this embodiment the blades, in spite of shaft actuation, are fed linearly to the conductor, as has already proven useful per se, for example, in known insulation stripping apparatuses.

The design according to the invention envisages that, in the case of drive shafts parallel to the main axis and intended for the insulation stripping blades and for the centering or retaining jaws, these blades and jaws are pivotable in one plane each. Thus, the pivotability of the blades or jaws is similar to that in the second embodiment (FIG. 3) of U.S. Pat. No. 5,010,797, as will be described in more detail later. There, however, the rotatability and in particular the drive shafts according to the invention are absent for the embodiment indicated at the time.

Alternatively, the insulation stripping blades and centering or retaining jaws can—in the case of drive shafts at an acute angle to the main axis—move or be pivotable on surfaces which are rotationally symmetrical with respect to the main axis.

In the first case, the plane is preferably approximately perpendicular to the main axis since only in this way is a section perpendicular to the main axis possible.

In the course of a fully automatic apparatus solution, it is a matter of course that the drive shafts are actuated by motors, in particular electrically, pneumatically or hydraulically, the motor actuation being in particular electronically regulatable or controllable.

Of courser it is also advantageous in the case of the apparatus according to the invention if a computer control is provided or is formed in such a way that different depth and length control parameters for multilayer insulation stripping (coaxial cables)—which can be input beforehand—are storable.

A particularly integrated apparatus is provided if the two drive shafts of the insulation stripping blades and centering or retaining jaws belonging to one another are arranged rotationally symmetrically with respect to the main axis and/or coaxially with one another relative to their own drive axis. In particular, the coaxial arrangement produces a very neat situation on the insulation stripping head, on which only a few components will be visible to the observer's eye and there are therefore advantages (space) with regard to chip removal and with regard to the removal of slugs and maintenance of the insulation stripping blades.

A preferred method of driving for the actuation of the rotation of the drive shafts themselves about their own axis at their end remote from blade or centering or retaining jaw is, according to the invention, by means of a control lever which on the one hand is firmly connected to the drive shaft and on the other hand engages cams, in particular control cones or the like, on a central control shaft coaxial with the main axis. The control levers can also be designated as rocker arms.

Once again better integration is achieved if the control cones for the insulation stripping blades and the control cones for the centering or retaining jaws are located axially one behind the other along the control shaft. Simultaneously or independently thereof, the control cones can preferably be in the form of rotating parts, which in turn leads to extremely economical production.

In a particularly elegant manner and with little complexity, the two control cones can, according to the invention, be displaceable relative to one another, the control cones of the centering jaws being drivable by means of a spring or brake from the control cones of the insulation stripping blades. By means of this development, firstly the movement of the insulation stripping blades and centering jaws partly independently of one another is ensured and secondly simple driving of both is possible.

Alternatively the two control cones can preferably be actuatable by means of a motor, also independently of one another, by axial displacement of the control shaft or by at least one control rod or control spindle in the interior of the control shaft.

Independently of the above-mentioned control rod in the interior of the control spindle, the control shaft can also be formed so as to be hollow in order to have a central cable sensor which is coaxial with the main axis, and displaceable along the main axis and on the one hand forms the length setting for the cable from which insulation is to be stripped or for a conductor and on the other hand forms a trigger element for the insulation stripping process. In fact, the cable sensor present in the HC 207 and MP 257 could also be used in exchangeable insulation stripping heads.

In order to make insulation stripping blades easier to exchange, it is advantageous if each insulation stripping blade is held in a separate blade jaw.

Novel blade jaws according to the invention have a separate trapezoidal groove for this purpose, in which the diametrically opposite insulation stripping blades can be fixed and released by means of a clamping wedge.

A completely different type of insulation stripping apparatus is obtained if the insulation stripping blades are themselves drivable tools—of the circular saw type or the like, drive elements for these tools then being guided in the blade jaws. Such drivable tools had been disclosed per se, for example, in the machine MCS 102 from ISIDA but have not become established in practice. However, drivable tools in combination with the novel principle of the present invention have acquired a new importance, especially since the newly present drive shafts are more suitable than previously used rocker arms for holding driving shafts or the like for drivable tools.

A preferred guide of a conductor or cable from which insulation to be stripped is obtained if at least the centering or retaining jaws are completely or partly roughened at least on their surface facing the cable or the optical fiber. The roughening can be effected by measures known per se, but, for example, also automatically by a suitable manufacturing process of these components. Thus, these components could be manufactured, for example, by means of water jet cutting, the desired roughness arising at the water jet interfaces.

The connection between the insulation stripping blades or the blade jaws or the centering or retaining jaws and the respective drive shaft can preferably be produced by calking or pressing. However, it is also within the scope of the invention to produce this connection by welding, soldering, screwing or adhesive bonding.

According to a further development, a further nonrotatable clamping device can be provided on that side of the insulation stripping blades which is opposite the sensor, the drive shafts with the insulation stripping blades and the drive shafts with the centering or retaining jaws being displaceable along the main axis relative to the clamping device for removing slugs. Alternatively, it is of course also possible for the clamping device to be displaceable for controlled removal of the slugs.

A simple drive actuation for the insulation stripping blades or the blade jaws and/or the centering or retaining jaws is obtained if they are spring-loaded in the opening direction. As a result, the motor drives need actuate precisely only in one direction.

Independently of the above, but also in relation to it, the invention relates to an insulation stripping apparatus having insulation stripping blades pivotable toward a main axis in a first normal plane, centering jaws which are pivotable toward and away from the main axis in a second normal plane to the cable or conductor being arranged in the immediate vicinity of the insulation stripping blades. The novelty and inventive step of this design compared with the design from FIG. 8 and FIG. 9 of U.S. Pat. No. 5,010,797 lies in the fact that firstly two jaw devices having pivotable jaws are provided parallel to one another, one of which (insulation stripping blades) is driven parallel to the other (centering jaws) by lateral swiveling inward in a parallel plane to the other. The drive method can be kept the same for both (insulation stripping blades and centering jaws) within the scope of the invention.

Since this design permits a completely novel concept for insulation stripping apparatuses which provides the advantages or solutions mentioned at the outset, it should also be independently protectable. However, the common basic concept of the two independent solutions provides uniformity in the sense of Art. 82 EPC.

An alternative novel design emerges in the context of the uniformity mentioned in the case of drive shafts at an acute angle to the main axis and intended for the insulation stripping blades and/or centering jaws, since these then swivel toward and away from the main axis on surfaces rotationally symmetrical relative to the main axis.

A slightly different broad field of protection arises independently of the first two insulation stripping apparatuses which are independent but connected by a common concept for those insulation stripping apparatuses according to the invention which have at least three insulation stripping blades and at least three centering or retaining jaws if these are each pivotably held by a drive shaft, preferably a hollow shaft, and at least two drive shafts each are arranged coaxially with one another, because this coaxial mounting of two drive shafts is novel and inventive for insulation stripping apparatuses, especially since the positive effects (space) described above result and also simple production is possible so that the problems mentioned at the outset are solved.

It is particularly preferable, but also occurs for the first time as a result of the novel form, according to the invention, of the actuation by drive shafts, if these are sealed from an insulation stripping head housing and are play-free. Such a seal can be most simply effected by an exact fit or guidance or by means of O-rings or the like and ensures that chips or the like cannot pass behind the housing or into the bearing. By means of this measure, the actuation is thus better protected than before from soiling.

In an embodiment of the invention, the centering or retaining jaws are arranged on that side of the insulation stripping blades which is remote from the housing—preferably between the insulation stripping blade and the clamping device.

In a further inventive concept which is independent of the above and likewise connected by a common inventive concept, an insulation stripping apparatus having blade jaws and insulation stripping blades which are pivotable along an arc toward and away from the main axis of the cable from which insulation is to be stripped simultaneously has centering jaws, the centering jaws being spring-loaded levers having a pivot point in the actuation axes of the insulation stripping blades. This design solves the problems mentioned at the outset and permits particularly good centering since this applies force where the blades are mounted and thus improves the precision of the insulation stripping. This is not only the case with nonrotatable insulation stripping apparatuses but of course even more so with an insulation stripping apparatus according to the invention, in which at least the blade jaws and insulation stripping blades are rotatable about the main axis.

EMBODIMENTS AND DESCRIPTION OF FIGURES

The invention is described in more detail with reference to nonlimiting embodiments shown schematically in the drawing.

Identical components are provided with identical reference numerals and components having an identical function but a different design bear identical reference numerals but with different indices. The figures are described as a whole.

Express reference is made to the figures and associated descriptions of figures of U.S. Pat. No. 5,361,384 and the content thereof is hereby incorporated by reference. For reasons relating to process economy and in order not to overload the content of this description, only the variants of the novel insulation stripping but not those parts of the head up to its main shaft 20a and 20b are described in the following description, insulation stripping machine which support the insulation stripping head or house the drive and not the drives and controls outside the insulation stripping head itself, since these parts can be adopted from any known insulation stripping apparatuses and it is no problem for the person skilled in the art to use the already known other mentioned components of the insulation stripping machines for the novel insulation stripping head. As already mentioned, the novel insulation stripping head can also be used as a spare part in existing insulation stripping machines, for example of the types HC 207 and in the MP 207 and MP 257 produced earlier, and in this respect the components used there for years and known to the person skilled in the art and the construction thereof are also hereby incorporated by reference. The figures in U.S. Pat. No. 5,361,384 mentioned provide information about these components and constructions in a fundamental and schematic manner.

BRIEF DESCRIPTION OF THE DRAWINGS

The drawing comprises the following figures:

FIG. 1a shows an insulation stripping head according to the invention, comprising three insulation stripping blades and centering jaws and an additional clamping device indicated only schematically;

FIG. 1b shows a variant of an insulation stripping head according to the invention, comprising two insulation stripping blades and two centering jaws and the same clamping device as in FIG. 1a;

FIG. 2a shows a central section through the plan view of the insulation stripping head according to FIG. 1b;

FIG. 1c shows a variant of an insulation stripping head according to the invention, having three oblique drive shafts;

FIG. 2b shows a section according to A-A through the setup of FIG. 2a;

FIG. 4 shows an exploded drawing of the setup according to FIG. 1a;

FIGS. 6 and 7 show improved centering jaws with a V-shape.

DETAILED DESCRIPTION OF THE INVENTION

Figure 3A:
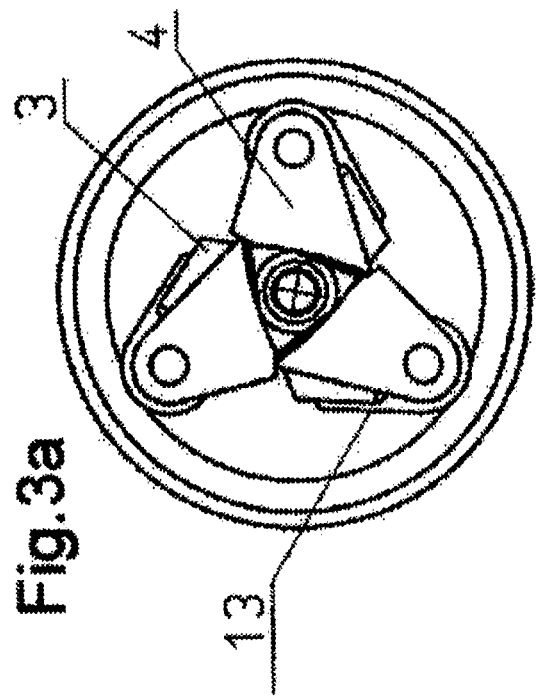
FIG. 3a shows a front view of the insulation stripping head according to FIG. 1a in the open state.
Figure 3C:
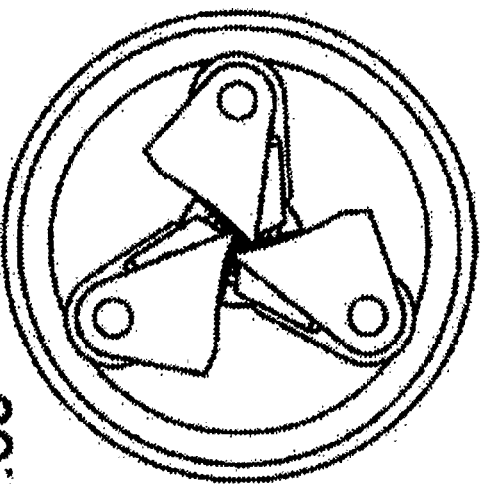
FIG. 3c shows the front view of FIG. 3a in the closed state (insulation stripping blades cutting in)
Figure 3B:
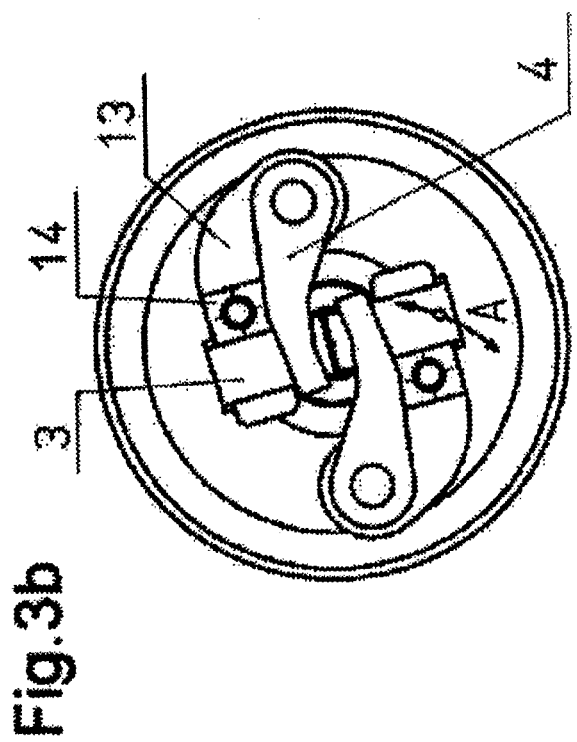
FIG. 3b shows a front view of the insulation stripping head according to FIG. 1b.

The different insulation stripping heads according to FIGS. 1a and 1b should be considered together for a certain function:

For the sake of simplicity, they are both shown in such a way that their insulation stripping blades 3a and 3b lie in the normal plane 7 (common in this diagram) to the main axes 1. According to an embodiment, the clamping device 15 is displaceable relative to this normal plane 7 so that—as shown in FIG. 1a—a cable 2 or the like can be pushed through the normal plane 7 into the space behind the insulation stripping blades 3a when the insulation stripping blades 3a are open and the insulation stripping jaws 4a are open, while, in the diagram according to FIG. 1b, the clamping device 15 has drawn the cable 2 out of the space behind the insulation stripping blades 3b back to before the normal plane 7 and has removed a slug (not visible in the figure) when the insulation stripping blades 3b have closed to the insulation stripping depth and centering jaws 4b have closed. The slug falls downward into the space behind the insulation stripping blades 3b or remains on the conductor of the cable 2 or the like if only limited insulation stripping (with "windows") is set.

This form of insulation stripping by means of displaceable clamping device 15 can be used according to the invention especially in the case of those insulation stripping apparatuses where the clamping device is formed as part of a larger automated unit by a manipulation arm which also performs other functions, such as, for example, cable transport to other processing apparatuses. In the case of straight-forward table top devices, the insulation stripping apparatus according to the invention is however generally formed as in the past, whereby the entire insulation stripping head 21a or 21b with its main shaft 20a or 20b, respectively, is longitudinally displaceable along its main axis 1.

The main shaft 20a or 20b corresponds substantially to the main shafts already used to date in the case of HC 207, MP 207 and MP 257 and it is for this reason that there too the integration of the novel insulation stripping head 21a or 21b can preferably be used as a spare part. At its end closest to the device (proximal end), the main shaft 20a; 20b has in each case a gear wheel 22 which serves for rotational driving of the insulation stripping heads 21a; 21b about their respective main axis 1. The gear wheel 22 is preferably driven by means of toothed belt and electric motor, as not shown in detail here but as already realized in the known machines mentioned.

This drive and each of the other drives which will also be mentioned later are preferably controlled in a programmable manner by electronic or electromechanical control 18.

At its end closest to the operator (distal end), each main shaft 20a; 20b carries a retaining body 23a; 23b, respectively. These retaining bodies 23a; 23b support hollow drive shafts 6c (3 units) or 6d (two units) on the distal end of which the insulation stripping blades 3a and 3b are nonrotatably mounted by means of blade jaws 13a and 13b, respectively.

Figure 4:
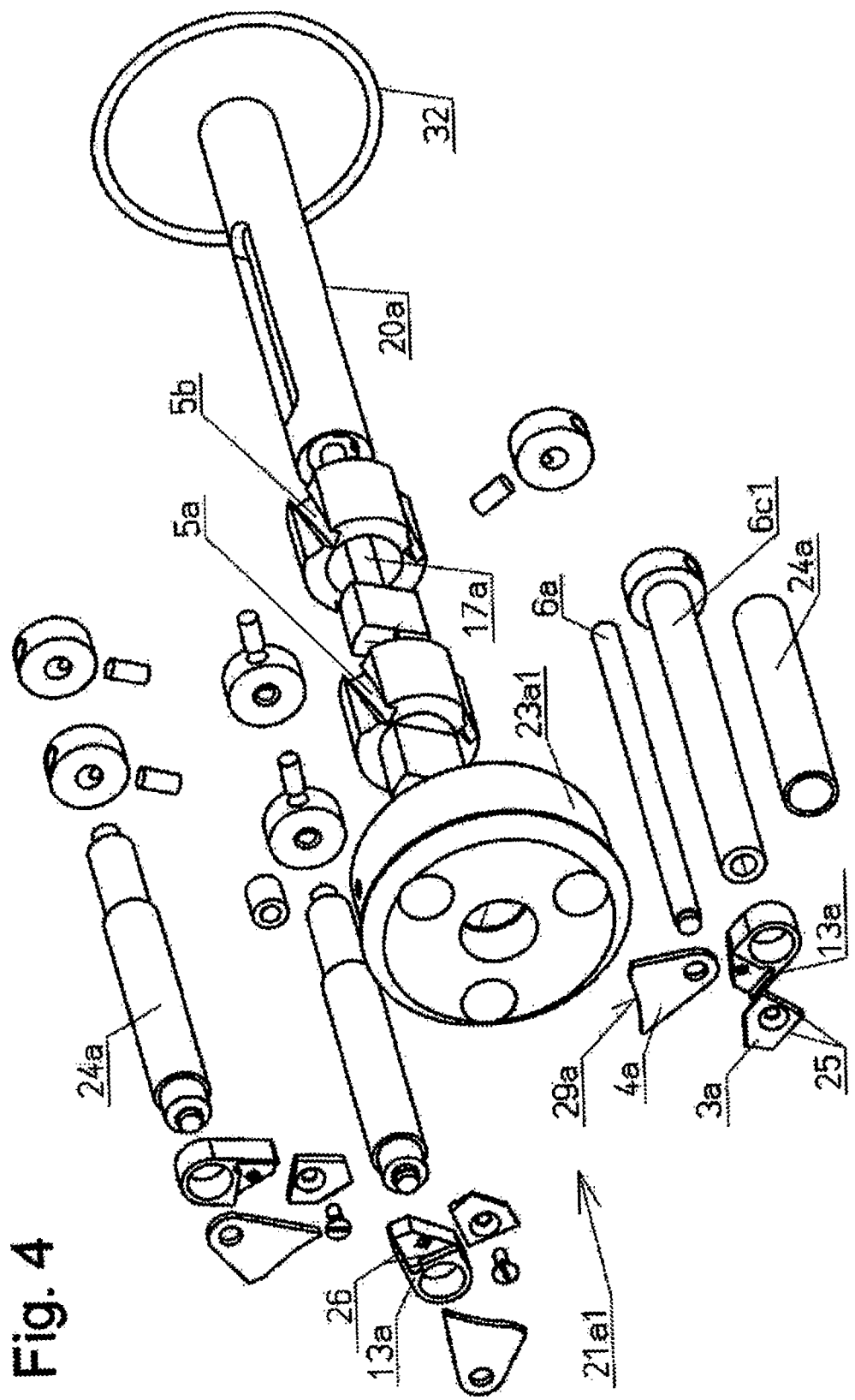

On the drive shafts 6c; 6d, cams 8a and 8b are fixed nonrotatably to the drive shafts 6c; 6d and convert a control movement, which is produced by control spirals 5a (FIG. 4) or by a control cone 9a, into a rotation or pivot movement at the blade jaws 13a; 13b and hence at the insulation stripping blades 3a; 3b. The control spirals 5a and the control cone 9a are mounted along the corresponding main axis 1 in the associated main shaft 20a; 20b and are controlled so as to be longitudinally displaceable. This longitudinal displacement thus produces the feed or opening of the insulation stripping blades 3a; 3b. The principle of the control cone is already realized in the machines HC 207, MP 207 and MP 257, where, however, wedges, which are more difficult to produce than the cones used here, are provided for the actuation. The control spirals 5a and 5b used according to the embodiment in FIG. 1a are novel and have an effect according to the invention: the actuation of the longitudinal displacement of the control spirals 5a and 5b in any direction leads to forced feeding or forced opening of the insulation stripping blades 3a and centering jaws 4a, respectively. In comparison, the design according to FIG. 1b requires one restoring spring— not shown—per drive shaft 16 for opening the insulation stripping blades 3b. The same applies in principle also to the retaining jaws.

In FIGS. 1a and 1b, the drive shafts 6c1; 6d1 are shown as tubes in bearing bushes 24a. They (6d) can however, as shown in FIG. 2a, also be guided within the retaining body 19 without a bearing bush. The latter requires fewer components. If this bearing bush 24a; 24b is produced from bearing bronze, only relatively little resistance to rotation of the drive shafts 6c1; 6d1 occurs in the case of good guidance. The design according to FIG. 2a shows a variant which also manages without an additional bearing bush (24) by virtue of the fact that the bearing body 23b and the drive shaft 6d are appropriately formed.

The insulation stripping blades 3a; 3b and the blade jaws 13a; 13b thereof have different designs. While, according to FIG. 1a and 4, the blade jaws 13a are designed as simple pivot levers and the insulation stripping blades 3a have a trapezoidal design, the insulation stripping blades 3b are formed so as to be rectangular like conventional insulation stripping blades and are displaceable in a trapezoidal groove 12 in the angled blade jaws 4b normal to the main axis 1. On adjustment of the insulation stripping blades 3b, optimization can thus be performed firstly by adjusting the blade jaw 13b and secondly by adjusting the insulation stripping blades 3b. Advantageously, this means that the blade quality itself can be lower, with simultaneously unchanged insulation stripping precision. The blades 3b may also have oblique cutting edges. Oblique cutting edges have the advantage that the contact point blade/cable migrates in the course of the incision process. This may increase the service life of the blade.

In comparison, the trapezoidal insulation stripping blades 3a are also simple and small leaf-like components which are cheaper to produce owing to their size and which can be fitted via their outer edge 25 into a diametrically opposite recess 26 in the blade jaws. According to a particularly preferred embodiment according to the invention, which can also be used independently of the present invention, the fixing of the leaf-like insulation stripping blades 3a is effected by means of a screw 27 having a conical head and a hole 28 with entry cone, the entry cone being slightly offset relative to the axis of the hole 28 or of the screw 27 so that, when the screw 27 is tightened, the insulation stripping blade 3a is pressed with its outer edge 25 into the recess 26. High precision is thus possible under conditions requiring particularly easy and rapid blade change. If the insulation stripping blades 3a are accurately produced, any adjustment after changing of the insulation stripping blade is unnecessary.

The driving and the mounting of the centering jaws 4a and 4b are provided so as to be analogous to the mounting and to the driving of the insulation stripping blades 3a; 3b. Drive shafts 6a and 6b are mounted within the drive shafts 6c and 6d, respectively, carry the centering jaws 4a; 4b at the distal end and proximally have cams 8c and 8d which cooperate with control spirals 5b and control cones 9b.

This "one in one" formation with very simple components (tubes or shafts) leads to very stable, integrated design. The principle of this design also permits the provision of further insulation stripping blades and/or centering jaws in order in certain circumstances to make different incisions simultaneously at different axial positions of a cable 2. For this purpose, only the drive shaft 6a or 6b would still have to be made hollow and a comparable arrangement to 6a-6c; 6b-6d with corresponding distal and proximal formation would have to be provided. Within the scope of the invention, such a multiblade design is also to be protected.

The centering jaws 4a; 4b have a different design. While the jaws 4a are in the form of triangular pivot levers having preferably a slightly concave centering edge 29a, the centering jaws 4b are slightly angled levers having a straight centering edge 29b. The centering edges 29a and 29b can be roughened. Such roughening can be automatically produced, for example by virtue of the fact that the centering jaws are produced by means of water jet cutting.

The control spirals 5a, 5b or the control cones 9a, 9b are moved by means of control spindles 17a and 17b or alternatively by means of axially displaceable rods or tubes which are guided in the interior of the main shaft 20a; 20b and emerge from the proximal end of the main shaft 20a; 20b in order to be actuated there by the drives known to the person skilled in the art.

If the control spindles 17 or rods are in the form of tubes, a cable contact sensor 11 (FIG. 2a) can also be arranged in the interior thereof. In this respect, reference is made in particular to the above-mentioned publications or teachings from the known insulation stripping apparatuses in which the function and mode of action of such a cable contact sensor 11 are indicated, which publications and teaching are incorporated herein.

The embodiment according to FIGS. 2a and 2b shows a version without bearing bushes 24. The shafts 6d1; 6d2 are mounted in the lengthened retaining body 23b. Since the bearing body contributes to the moment of inertia of the insulation stripping machine, it may also have, in addition to the holes for the drive shafts 6, blind holes for weight reduction, which are not shown. It is preferably composed of light metal, in particular of aluminum or of an aluminum alloy. Apart from the cable contact sensor 11, however, FIGS. 2a and 2b correspond to FIG. 1b.

Figure 5:
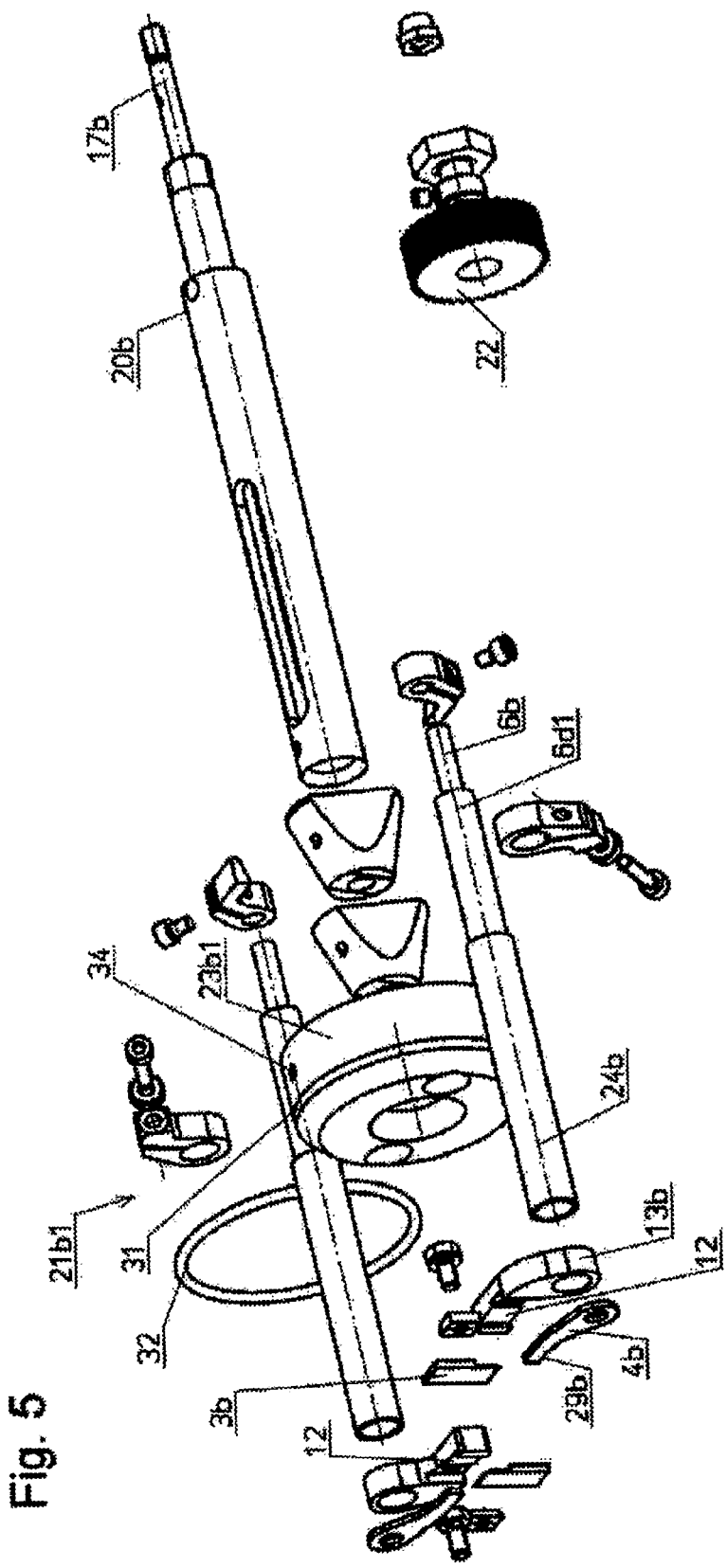
FIG. 5 shows an exploded drawing of the setup according to FIG. 1b.

For protecting the insulation stripping head 21a; 21a1; 21b; 21b1, an insulation stripping head housing 19 (FIGS. 2a; 2b) is provided which is held by means of particularly original fixing according to the invention with only a single screw parallel to the main axis and approximately without eccentricity on the retaining body 23a; 23b; 23a1; 23b1, so that simple dismantling is possible:

As can best be seen from FIG. 5, the distal end of the retaining body is provided with an annular groove 31 into which an O-ring 32 is inserted in the assembled state. The O-ring 32 has a dimension such that it projects from the annular groove 31 in the inserted state. The inserted O-ring 32 serves as a stop for the tubular insulation stripping head housing 19 (FIGS. 2a; 2b) when it is pushed from the proximal to the distal end. Since the annular groove 31 is present in a normal plane to the main axis 1, this stop—if the insulation stripping head housing 19 has a distal end edge 33 which is normal to its lateral surface—provides optimum parallel and hence eccentricity-free alignment of the insulation stripping head housing 19 with the main axis 1. The O-ring 32 is thus a seal and a stop for the insulation stripping head housing. The major advantage in addition to the simple production is that the O-ring can be easily removed and the insulation stripping head housing 19 can thus be pushed in the distal direction (in the direction of the blade) or removed in the downward direction. This permits particularly fast and easy access to the cam/control lever.

The housing 19 can be fixed by means of a securing screw 34 on the retaining body 23a; 23b; 23a1; 23b1 to prevent said housing from moving in the proximal direction. This design of an insulation stripping head housing and its fixing to an insulation stripping head 21a; 21b; 21a1; 21b1 is novel, inventive and protective independently of the other features of this Application and can also advantageously be used in other insulation stripping machines owing to its simplicity.

For stripping the insulation from very fine cables (MC or MX head), it is possible to choose a further version which in these cases is the preferred embodiment, in which the insulation stripping blades (3) and/or the centering and retaining jaws (4) are guided in linear guides (.) and by means of which drive shafts (.) coordinated in each case with them can be moved directly or indirectly—for example by means of a gear.

The invention covers also an improvement of rotary centering jaws, which is preferably used with the new stripping head but also independently of it. The V-shaped centering jaws are attached on one rocker each at the drive shafts 6b. These rotate with the stripping head. The two V-shaped centering jaws have identical geometry and are oppositely arranged to each other about an angle of 180°.

The V-shaped centering jaws 4c exhibit two to each other centering surfaces 29c, 29d which lie in tangential planes of the cable (represented in FIGS. 6 and 7 as 29c and 29d). The two centering jaws 4c are so far set synchronously with the movement of the blades 3c that the cable (2 in FIG. 1) can be centered by four surfaces 29c, 29d before the cutting process begins.

The control of the centering jaws 4c takes place equal as those of the centering jaws 4a and/or 4b in the other variations of the invention and/or figures. The closing movement of the V-shaped centering jaws 4c lasts until the centering jaws 4c on the cable rest upon and the spring action of the spring between the cone 9a and the cone 9b is not sufficient any longer, in order to close the centering jaws still further. The cable is not able because of automatic locking or automatic locking in the position to open the V-shaped centering jaws 4c again.

The V-shaped jaws 4c have the goal to limit the translatoric degrees of freedom in radial direction to the cable axis if possible. The cable is to be hindered to move radially with respect to the cable axis. It is to be prevented that on the cable a moment is exercised, which leads to the fact that the cable twists. Further a lasting deformation or another damage of the cable surface is to be avoided. This is reached by an improvement in that the centering surfaces (represented in FIGS. 6 and 7 29c and 29d) are smoothly as implemented as possible or exhibit even a friction-reducing coating. The twisting force on the cable must be sufficient little, in order to center the cable best. Too large surface pressure should not arise. Depending upon cable properties an optimal relationship between the size of the centering surfaces, the spring between the two cones 9 or control spiral 5 and friction conditions (e.g. Surface finish of the rear cone) has to be chosen.

The V-shaped centering jaws 4c are in such a way arranged that they are as close as possible to the cutting place. The centering surface 29c lying in direct neighborhood to the blade 3c should be preferentially parallel to the blade edge 3c aligned. Thus it is reached that also a bend-flabby cable cannot evade locally in cutting direction of the gumption movement. If the close lying centering surface 29c-like the surface 29d-were arranged perpendicularly to the blade edge (i.e. the red surface would lie in direct neighborhood to the blade), the cable locally to the cutting movement evade, which could lead to transferred cutting by the two blades 3c. In such a case a double cut could arise, what should be avoided. This effect appears with very fine cables rather as with somewhat thicker cables. However also a rigid cable is better led by the arrangement of the centering surfaces shown in the FIG. 6. The closing movement of the two V-shaped centering jaws 4c is coupled with one another. Effected symmetrically via the interlinking training of the two centering jaws (surfaces 29c lies in another radial plane than the surfaces 29d) the centering jaws support themselves—as soon as they actual enclosed a cable—against each other in axial direction off the cable, which improves the centering quality.

The invention is not limited by the figures shown and descriptions of figures and instead its scope of protection arises exclusively from the patent claims and from those points where reference is additionally made to independent protection.

LIST OF REFERENCE NUMERALS

1 Main axis is that axis about which insulation stripping blades, optionally centering jaws and drive shafts are rotatable in one orbit each. At the same time, the cable is inserted along this axis so that its longitudinal axis coincides with the main axis.
2 Cable, insulated conductor, optical fiber or the like
3 Insulation stripping blade
4 a,b,c Centering or retaining jaws
5 Control spiral
6 Drive shaft
6+ Rotationally symmetrical surface or plane inclined at an obtuse angle to the main axis 1
7 Plane
8 Cam or control lever
9 a, b control cones
10 Coaxial, central control shaft
11 Cable contact sensor
12 Trapezoidal groove
13 Blade jaws
14 Clamping wedge
15 Clamping device
16 Pressure spring
17 Control spindle
18 Computer control or electronic or electromechanical control
19 Insulation stripping head housing
20 Main shaft
21 Insulation stripping head
22 Gear wheel
23 Retaining body
24 Bearing bush
25 Outer edge
26 Diametrically opposite recess
27 Screw
28 Hole with conical countersinking
29 a,b,c,d Centering edge or surface
30 Rods or tubes
31 Annular groove
32 O-ring
33 End edge
34 Securing screw

What is claimed is:

1. An insulation stripping head comprising:
a rotary retaining body configured to rotate around a main axis;
said retaining body having a distal end;
said retaining body having a proximal end;
a plurality of passages in said retaining body, each said passage passing from said proximal end to said distal end;
a plurality of coaxial drive shaft assemblies, each one respectively passing through a respective one of said plurality of passages in said retaining body, and each radially spaced from the main axis;

said plurality of coaxial drive shaft assemblies each including a respective hollow drive shaft;
said plurality of coaxial drive shaft assemblies each including a respective inner drive shaft configured to pass through said respective hollow drive shaft;
said retaining body connected to a rotary main shaft configured to rotate on the main axis and thus orbit said plurality of coaxial drive shaft assemblies around the main axis;
a respective hollow drive shaft cam on each of said hollow drive shafts;
a respective inner drive shaft cam on each of said inner drive shafts;
on said main shaft, a first longitudinally displaceable control mechanism configured to actuate said hollow drive shaft cams; and,
on said main shaft, a second longitudinally displaceable control mechanism configured to actuate said inner drive shaft cams.

2. An insulation stripping head as claimed in claim 1, further comprising:
a stripping blade operatively connected to one of said hollow drive shafts.

3. An insulation stripping head as claimed in claim 1, further comprising:
a retaining jaw operatively connected to one of said inner drive shafts.

4. An insulation stripping head as claimed in claim 3, further comprising:
a roughened centering edge on said retaining jaw.

5. An insulation stripping head as claimed in claim 1, further comprising:
said plurality of passages in said retaining body each having a respective inner wall; and,
a bearing bushing disposed between said inner wall of one respective passage and said respective coaxial drive shaft assembly passing through said one respective passage.

6. An insulation stripping head as claimed in claim 1, further comprising:
a plurality of respective stripping blades operatively connected, respectively, to said hollow drive shafts; and,
a plurality of respective retaining jaws operatively connected, respectively, to said inner drive shafts.

7. The insulation stripping head as claimed in claim 1, wherein:
said first longitudinally displaceable control mechanism is a control cone.

8. The insulation stripping head as claimed in claim 1, wherein:
said first longitudinally displaceable control mechanism is a control spiral.

9. The insulation stripping head as claimed in claim 1, wherein:
said second longitudinally displaceable control mechanism is a control cone.

10. The insulation stripping head as claimed in claim 1, wherein:
said second longitudinally displaceable control mechanism is a control spiral.

11. The insulation stripping head as claimed in claim 1, wherein:
at least one of said plurality of passages in said rotary retaining body has an axis oblique to the main axis of said retaining body and of said main shaft.

12. An insulation stripping head as claimed in claim 1, further comprising:
a housing connected to said retaining body.

13. An insulation stripping head as claimed in claim 12, further comprising:
on said retaining body, an O-ring configured to contact said housing.

14. An insulation stripping head as claimed in claim 12, further comprising:
a securing screw fastening said housing to said retaining body.

15. An insulation stripping head as claimed in claim 1, further comprising:
a control spindle operatively connected to said first longitudinally displaceable control mechanism.

16. An insulation stripping head as claimed in claim 15, further comprising:
a cable contact sensor passing through said control spindle.

17. An insulation stripping head as claimed in claim 1, further comprising:
a first V-shaped centering jaw connected to one of said plurality of coaxial drive shaft assemblies; and,
a second O-ring centering jaw connected to a second coaxial drive shaft assembly.

18. An insulation stripping head as claimed in claim 17, further comprising:
a first pair of centering surfaces on said first V-shaped centering jaw; and,
a second pair of centering surfaces on said second V-shaped centering jaw.

19. An insulation stripping head as claimed in claim 1, further comprising:
a blade jaw connected to one of said hollow drive shafts; and,
a stripping blade attached to said blade jaw.

20. An insulation stripping head as claimed in claim 19, further comprising:
in said blade jaw, a recess configured to receive said stripping blade.

21. The insulation stripping head as claimed in claim 20, wherein:
said recess is trapezoidal-shaped.

22. An insulation stripping head as claimed in claim 19, further comprising:
a screw fixing said stripping blade to said blade jaw.

23. An insulation stripping apparatus comprising:
a rotary main shaft configured to rotate on a main axis;
a rotary retaining body connected to said main shaft for mutual rotation;
said retaining body having a distal end;
said retaining body having a proximal end;
three passages in said retaining body, each said passage passing from said proximal end to said distal end, and each said passage radially offset from the main axis;
three coaxial drive shaft assemblies, each assembly respectively passing through a respective one of said three passages in said retaining body;
each of said three coaxial drive shaft assemblies including a respective hollow drive shaft;
each said hollow drive shaft operatively connected to actuate a respective stripping blade;
each of said three coaxial drive shaft assemblies including a respective inner drive shaft configured to pass through said respective hollow drive shaft;
each said inner drive shaft operatively connected to actuate a respective retaining jaw;

a respective hollow drive shaft cam on each of said three hollow drive shafts;

on said main shaft, a first control spiral configured to actuate said hollow drive shaft cams;

a respective inner drive shaft cam on each of said three inner drive shafts; and, on said main shaft, a second control spiral configured to actuate said inner drive shaft cams.

24. An insulation stripping apparatus as claimed in claim 23, further comprising:

each of said three passages in said retaining body each having a respective inner wall; and, each of said three passages has a respective bearing bushing disposed between its respective inner wall and the respective coaxial drive shaft assembly passing through said respective passage.

25. The insulation stripping apparatus as claimed in claim 23, wherein:

each of said three passages in said rotary retaining body each has a respective passage axis oblique to the main axis of said retaining body and of said main shaft.

26. An insulation stripping apparatus as claimed in claim 23, further comprising:

a housing connected to said retaining body.

27. An insulation stripping apparatus as claimed in claim 23, further comprising:

three blade jaws, each one respectively connected to a respective one of said three hollow drive shafts; and, three stripping blades, each one respectively attached to a respective one of said three blade jaws.

28. An insulation stripping apparatus as claimed in claim 27, further comprising:

in each of said three blade jaws, a respective recess configured to receive a respective one of said three stripping blades.

29. An insulation stripping apparatus as claimed in claim 23, further comprising:

a nonrotatable clamping device positioned at a greater distance from said distal end than the distance of said stripping blades from said distal end.

30. An insulation stripping apparatus comprising:

a rotary main shaft configured to rotate on a main axis;

a rotary retaining body connected to said main shaft for mutual rotation;

said retaining body having a distal end;

said retaining body having a proximal end;

two passages in said retaining body, each said passage passing from said proximal end to said distal end, and each said passage radially offset from the main axis;

two coaxial drive shaft assemblies, each assembly respectively passing through a respective one of said two passages in said retaining body;

each of said two coaxial drive shaft assemblies including a respective hollow drive shaft;

each said hollow drive shaft operatively connected to actuate a respective stripping blade;

each of said two coaxial drive shaft assemblies including a respective inner drive shaft configured to pass through said respective hollow drive shaft;

each said inner drive shaft operatively connected to actuate a respective retaining jaw;

a respective hollow drive shaft cam on each of said two hollow drive shafts;

on said main shaft, a first control cone configured to actuate said hollow drive shaft cams;

a respective inner drive shaft cam on each of said two inner drive shafts;

on said main shaft, a second control cone configured to actuate said inner drive shaft cams; and, a control spindle passing through said main shaft and operatively connected to said first control cone.

31. An insulation stripping apparatus as claimed in claim 30, further comprising:

a first V-shaped centering jaw connected to one of said inner drive shafts; and, a second V-shaped centering jaw connected to a second of said inner drive shafts.

32. An insulation stripping apparatus as claimed in claim 30, further comprising:

a nonrotatable clamping device configured to displace cable along the main axis.

* * * * *